United States Patent [19]

Konig et al.

[11] Patent Number: 4,882,501

[45] Date of Patent: Nov. 21, 1989

[54] POWER SUPPLY ARRANGEMENT FOR ELECTRO-HYDRAULIC CONTROL SYSTEMS IN MINING AND CIVIL ENGINEERING

[75] Inventors: Johannes Konig; Martin Reuter, both of Munich, Fed. Rep. of Germany

[73] Assignee: Gewerschaft Eisenhutte Westfalia GmbH, Fed. Rep. of Germany

[21] Appl. No.: 191,549

[22] Filed: May 9, 1988

[30] Foreign Application Priority Data

May 9, 1987 [DE] Fed. Rep. of Germany ....... 3715590

[51] Int. Cl.[4] .................................................. H02J 1/00
[52] U.S. Cl. .......................................... 307/11; 307/39
[58] Field of Search ...................... 307/11, 12, 31, 33, 307/38, 39, 35; 364/492, 493; 340/310 R, 310 A

[56] References Cited

U.S. PATENT DOCUMENTS

| | | | |
|---|---|---|---|
| 4,245,319 | 1/1981 | Hedges .............................. | 307/38 X |
| 4,336,462 | 6/1982 | Hedges et al. ..................... | 307/38 X |
| 4,471,232 | 9/1984 | Peddie et al. ..................... | 307/38 X |
| 4,549,274 | 10/1985 | Lerner et al. ..................... | 307/39 X |

*Primary Examiner*—William M. Shoop Jr.
*Assistant Examiner*—Sharon D. Logan
*Attorney, Agent, or Firm*—Samuels, Gauthier, Stevens & Kehoe

[57] ABSTRACT

A power supply arrangement which is intended, in particular, for intrinsically safe electro-hydraulic control systems for mining and comparable applications, in which several control units and loads controlled thereby are supplied as a group from a common constant voltage source. The voltage source has a current capacity which is smaller than the total current requirement of all the units and loads supplied by it. Each control unit has actual value current measuring device and two controllable current sources which are connected to a common potential line which can simultaneously act as a data bus. The arrangement enables the respective effective dynamic current consumption and demands of the control units and loads to be ascertained to enable the available power of the constant voltage source to be determined at any time at the individual control units. The available power of the source can be utilized for an optionally time-staggered ordered control process according to predetermined priorities without overloading the voltage source.

12 Claims, 3 Drawing Sheets

POWER SUPPLY ARRANGEMENT FOR ELECTRO-HYDRAULIC CONTROL SYSTEMS IN MINING AND CIVIL ENGINEERING

FIELD OF THE INVENTION

The present invention relates in general to a power supply arrangement. The invention is particularly, but not solely, concerned with power supply arrangements for electro-hydraulic control systems in mining and civil engineering. The invention can also be used for similar or comparable applications of the type frequently encountered in mining or civil engineering, for example in systems for monitoring and/or controlling mining extraction plant, for example cutting devices, drum shearers, devices for the hydraulic adjustment of the cutting level of extraction machinery, of complete or partial cutting machinery, of the type used, in particular, for advancing or tunnelling and the like, of advancing and cutting shields etc.

BACKGROUND TO THE INVENTION

In known electro-hydraulic control systems for mineral, e.g. coal, mining installations each roof support along a working is provided with an electronic control unit with all the control units being connected to one another and optionally to a central control station via a data transmission system for the transmission of data (see "Glückauf" 1981, pages 1155–1162; "Glückauf" 1984, pages 135–140; "Glückauf" 1986, pages 543–552; and "Glückauf" 1986, pages 1183–1187). The integrated control units usually have keyboards with which the various control processes (hydraulic individual control, continuous control at the adjacent supports and optionally sequential control with so-called sliding support groups) can be carried out.

It is necessary to provide electrical power at an intrinsically safe level and in known control systems, each support and therefore each control unit is provided with its own power supply which is optionally integrated with the face lighting circuits. Such decentralized power supply arrangements are distinguished by high reliability but necessitate considerable expense. With the large number of supports normally provided in an extraction operation, the expense is extremely high not only for the power supply system but also for the data transmission system.

A power supply arrangement for electro-hydraulic control systems or other electric loads in mining is known from DE-PS No. 35 38 251, in which a group of electronic control units for switching in electric loads in the form of electromagnetic valves is provided with a common electric power pack which is designed for a maximum current capacity which is smaller than the total current requirement of all loads. In this arrangement, therefore, more electric loads can be connected to the power pack than the power pack can properly supply. Logic comparisons about the number of loads supplied in comparison with the maximum number of loads which can be supplied are carried out in the control units by means of control logic in the electronic control means e.g. microprocessor or microcomputer of the units. This should ensure that, at any moment, the electric power pack is supplying only the maximum number of electric loads that it can supply according to its capacity. Overloading of the power pack is thus avoided but this arrangement is not particularly versatile and it does not respond in a dynamic sense to changing conditions or priorities.

An object of the invention is to provide an improved power supply arrangement.

SUMMARY OF THE INVENTION

According to the invention there is provided a power supply arrangement for use in an electro-hydraulic support control system for mining and civil engineering, in which a group of control units utilize control means in the form of microprocessors, microcomputers or electronic evaluators to control temporary power supply of electrical loads from a constant voltage source common to the group, the voltage source being designed for a maximum current capacity which is smaller than the possible total current requirement of all electric loads supplied by it; said arrangement comprising a current measuring device for each control unit for determining the effective dynamic current consumption of the unit and the loads controlled thereby, and adjustable current source which is adjusted by the device to a current value dependent on the effective current consumption and a common potential line connected to all the adjustable current sources which carries a voltage which varies according to the total current consumption. The current consumption dependent voltage is usable by the control means in the control units for determining the quantity of current still available from the source.

Preferably, each control unit is further provided with a voltage measuring device which measures the voltage on the common potential line and transmits the information to the control means and a further current source which is controlled by the control means and is connected to the common potential line. The further current source provides a current which is dependent on a demanded current requirement for influencing the voltage on the common potential line during or before initiation of a control operation by the unit.

An arrangement in accordance with the invention also ensures the common voltage source cannot be overloaded but in a far more flexible manner ensuring the distribution of the electric energy available can take place according to predetermined priorities so that control processes which are more critical in time or are more important in function can have priority over control processes which are not critical in time or are less important in function. With an electro-hydraulic control system for mining in which the arrangement according to the invention is incorporated each group generally comprises about six to fifteen, preferably from eight to twelve control units which are each mounted on a respective roof support disposed on a row standing next to one another along a longwall working.

In the arrangement according to the invention, the respective effective current consumption or actual current in the system is determined at each control unit by means of the actual valve current measuring device. Therefore, the quantity of current which is still available and which the voltage source or power pack connected to the control group can still deliver without overloading is also known at each control unit. The quantity of current still available in each case can be used for the various control processes if the capacity of the current source is appropriately utilized, i.e. according to predetermined selection criteria optionally with time-staggered performance of the individual control processes. Consequently, control processes which are not critical in time can be synchronized at the various control units without the voltage source or power pack being overloaded. The available electric energy can be distributed according to predetermined priorities so that control processes which are critical in time or more important in function invariably have priority over control processes which are not critical in time or less important in function. The priorities can be determined by the software of the microcomputers or electronic evaluators of the various control units. It is particularly important that the electrical energy available and also, if necessary, the energy required for the respective demanded control processes, i.e. the energy requirement demanded at any time, are known at any moment at the individual control units so that the desired control processes can be carried out without overloading the common current source by adapting the control units to one another.

The voltage measuring devices measure the voltage on the common potential line and supplies the information to the control means so that the available electrical energy is known at any time. The arrangement according to the invention is advantageously constructed such that the individual control units simultaneously determine the current requirement necessitated by the initiation of control processes and transmit the requirement values to the other control units in the group so that co-ordinated performance of the desired control processes is possible as a function of the respective current requirement and the quantity of current available at any time and/or as a function of predetermined priorities. For this purpose, the control units are each advantageously provided with the further current source which is controlled by the control means and is connected to the common potential line. The further sources act as requirement value current sources and introduce onto the common potential line a variation which is dependent on the demanded current requirement during or before initiation of a control process at a control unit. The voltage on the potential line at any time is consequently proportional to not only the effective current consumption but also the effectively demanded current requirement.

The common potential line can be connected via a resistor to a supply line carrying a higher potential from the constant voltage source so that common potential line is always at a voltage lower than the positive supply line. With this arrangement, the common potential line can simultaneously form a data bus for communication between the control units so that the total system is further simplified in its construction. An intrinsically safe direct current source is generally used as constant voltage source for the arrangement according to the invention. The current-carrying conductors of the voltage source as well as the common potential line which preferably simultaneously forms the data bus are advantageously combined to form a multi-core cable.

The invention may be understood more readily, and various other aspects and features of the invention may become apparent from consideration of the following description.

BRIEF DESCRIPTION OF DRAWINGS

Embodiments of the invention will now be described, by way of examples only, with reference to the accompanying drawings, wherein.

DESCRIPTION OF PREFERRED EMBODIMENTS

Figure 1:
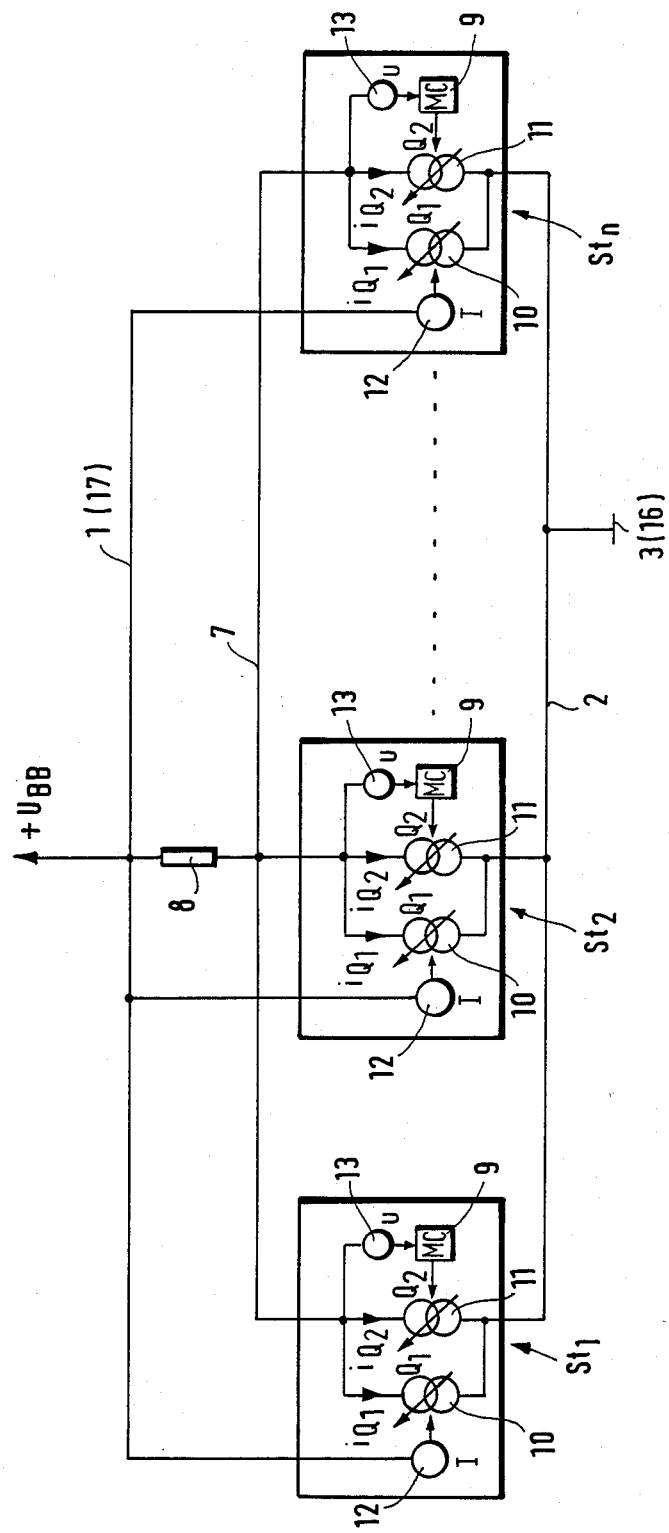
FIG. 1 is a schematic representation of a power supply arrangement constructed in accordance with the invention.

FIG. 1 shows the current distributing concept of a system in which a number of electronic control units $St_1$, $St_2$, ... $St_n$ are combined to form independent groups with respect to the power supply. The power is supplied to the units of a group by means of a common constant voltage source, with an output at high potential $+U_{BB}$ (say $+12$ v) connected to an electric supply line 1 and an output at lower potential (0 V) connected to a line 2. The line 2 can be connected to earth 3. All the control units $St_1$, $St_2$, ... $St_n$ are connected via the lines 1 and 2 to the associated common constant voltage source so that the inherent electrical loads of the control units themselves as well as those of the loads which are controlled by the units and/or are supplied with current in association therewith are all powered from this voltage source.

The control units may form part of an electrohydraulic control system for a mineral mining installation and in this case the loads can be represented by electromagnetically operated valves which are switched by the associated control units. In this application the control units $St_1$, $St_2$, ... $St_n$, each have an operator component with a keyboard which can trigger the various control processes when actuated. The electric loads supplied with current via the control units are not shown in FIGS. 1 and 2 for the sake of clarity but FIG. 3 shows these electric loads in the form of valve units 4 which, are equipped with a large number of electromagnetic valves which are operated by the associated control units. The connections between the control units and the valve units 4 are designated 5. FIG. 3 also shows a power pack 6 for the supply of current to all control units in the group in addition to the associated electric loads. The power pack 6 represents the constant voltage source and is generally an intrinsically safe direct current source. The constant voltage source 6 has a current supply capacity which is smaller than the possible total current requirement of all electric loads supplied by it. The loads which are connected to the control units $St_1$, $St_2$, ... $St_n$ of the group would therefore overload the source or power pack 6 in their total current requirement. For this reason, the power supply arrangement is designed such that, during operation, the current is distributed with high utilization of the power pack but without the power pack being overloaded.

As shown in FIG. 1, the control units $St_1$, $St_2$, ... $St_n$ are connected to a common connection line 7 at intermediate potential. For convenience, a resistor 8 is connected between the lines 1 and 7. Each control unit $St_1$, $St_2$, ... $St_n$ comprises, among other things, control means 9, such as a microcomputer, microprocessor or an electronic evaluator as well as two controlled current sources 10 and 11 which are connected in parallel, between the lines 2 and 7 and can consist of controlled transistors. In addition, each control unit is provided with a current measuring device 12 which measures the effectively consumed current of the associated control unit including any connected electric loads. A control link between the device 12 and the current source 10 serves to adjust the latter as a function of a measured actual current value in the associated control unit. The current measuring device 12 consequently adjusts the associated current source 10 to a current iQ1 corresponding or proportional to the actual current in the supply line 1. A parameter which is representative of the effectively consumed currents in the control units $St_1$, $St_2$, ... $St_n$ therefore appears as a variable voltage on the common line 7. As the source parameters (current and voltage) of the constant voltage source are known and the common line 7 carries a load-dependent voltage potential, it is possible to determine the still available power of the constant voltage source at any time at any control unit.

Each control unit $St_1$, $St_2$, ... $St_n$ also comprises a voltage measuring device 13 which measures the voltage on the line 7 and supplies the measured voltage value to the control means 9 so that the latter can determine from the supplied data the current still available in each case, i.e. the available power reserve of the constant voltage source.

If a control process which requires a certain quantity of current is to be initiated, for example, at a control unit, the performance of this control process must be prevented from overloading the constant voltage source 6, or an identical or different process must be prevented from taking place at one or more of the other control units, as this would lead to an overloading of the voltage source in conjunction with the initiated control process. The control means or microcomputer 9 of the control unit at which the control process is initiated transmits the current requirement associated with this control process via the controlled current source 11, which thus forms a required value current source, to the other control units by allowing the current iQ2 to flow through the line 7. This current iQ2 then represents a measure of the quantity of current required for the demanded control process. The other control units which also follow the voltage on the common line 7 via their voltage measuring devices 13 then determine that the still available power of the voltage source has fallen owing to the reduced voltage potential of the line 7. This information enables the other control units to abandon control processes with a current consumption exceeding the capacity of the voltage source.

With the described arrangement, therefore, requirement-dependent distribution of the available current from a common voltage source which is underdimensioned in its power is possible since the current consumption and the demanded current requirement of all participants in the line 7 are represented at any moment by addition of the currents so that the voltage drop across the resistor 8 is dependent on the sum of the currents. Each control unit $St_1$, $St_2$, ... $St_n$ is therefore informed at each moment about the total consumed current and the total demanded current. The available power of the voltage source can consequently be distributed via the associated microcomputers or evaluation circuits in such a way that the demanded functions or control processes can be carried out with time staggering and optionally adapted to predetermined priorities in their time sequence while utilizing the voltage source well but not overloading it.

FIG. 3 shows the electrical connection between the various control units of a group but only the last two control units $St_9$ and $St_{10}$ of the group comprising some ten control units are represented together with the constant voltage source or power pack 6 belonging to the group and an associated current input adapter 14. The control units are all connected to one another via a multi-core cable 15 and are connected to the current input adapter 14 at the end of the group. The two conductors or wires 16 and 17 serve to supply the control units and connected loads (valve units 4) with current. They thus correspond to the lines 1 and 2 in FIG. 1. The potential line 7 shown in FIG. 1 is a third line conductor wire. A fourth line conductor wire 18 of the cable 15 serves for bi-directional data interchange between two immediately adjacent control units, as known in electro-hydraulic control systems with bi-directional adjacent control. The potential line 7 extends over the entire group of control units. It ends at the current input adapter 14 which can contain the resistor 8 according to FIG. 1 which is connected between the lines 7 and 17 in the current input adapter 14. The conductors 16 and 17 serving to supply the power are electrically isolated from the adjacent group of control units at the power input adapter at 19. The potential line 7 preferably forms at the same time a data bus to which all control units $St_1$, $St_2$, ... $St_n$ of the group are connected and which encompasses the data bus 18 for bi-directional adjacent communication and forms a redundant data bus system.

Figure 2:
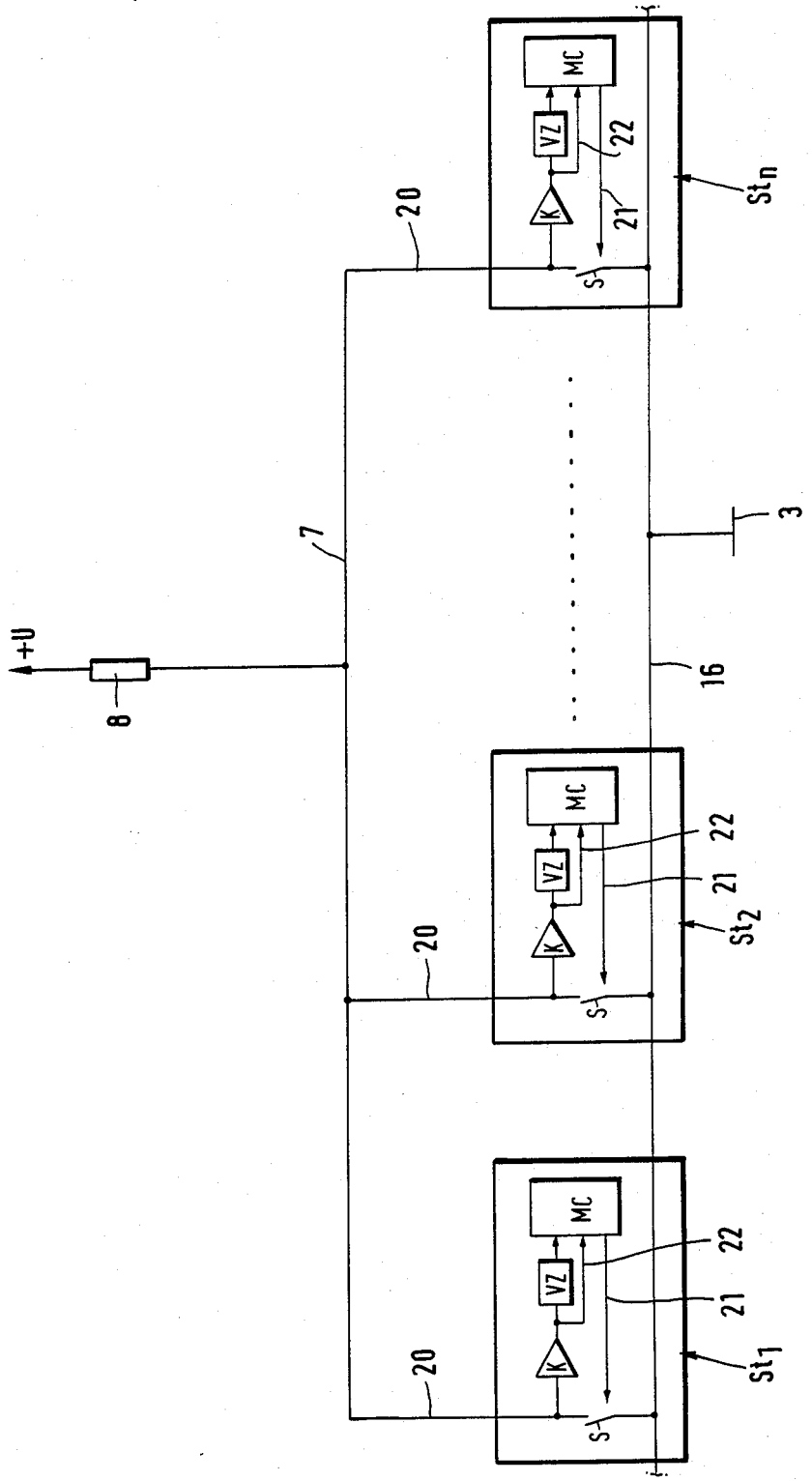
FIG. 2 is a schematic representation of a further arrangement usable in an electro-hydraulic control system.
Figure 3:
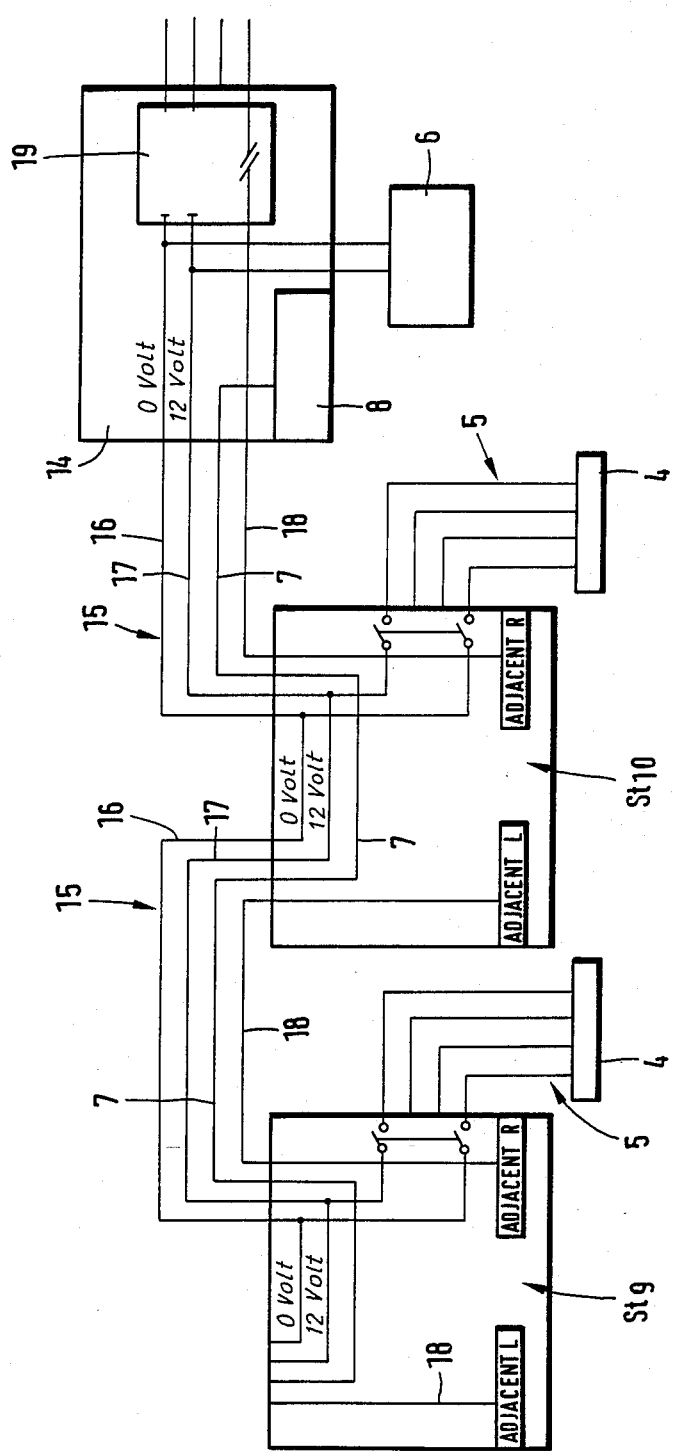
FIG. 3 is a block schematic diagram depicting part of the control system.

An advantageous data transmission system for the case where the potential line 7 simultaneously forms a data bus is shown in FIG. 2, only those devices and components required in this case for conflict-free data transmission being shown at the control units $St_1$, $St_2$, ... $St_n$ of the group.

The control units $St_1$, $St_2$, ... $St_n$ form microcomputer-controlled transmitting and receiving stations which are joined together via single wire and are connected via the line 16 to the O-potential which consequently forms a common reference potential for all control units. The data bus formed by the potential line 7 is connected via the resistor 8 to the operating voltage $+U$, namely the voltage in the supply line (FIG. 1) or 17 (FIG. 3).

Each control unit $St_1$, $St_2$, ... $St_n$ is connected via a connection 20 to the data bus 7 and to the line 16 carrying the reference potential. Each of the units employs an electronic switch S which ensures that the data bus 7 can be brought to the reference potential of the line 16. If the switch S of the any of the control units is closed, then the data bus is at the reference potential. Only if all the switches S are open does the data bus 7 carry a higher potential because, as described in connection with FIG. 1, the sum of the currents from the controlled current sources 10, 11 flows through the resistor 8.

Each control unit of the group has a comparator K which has an input connected to the line connection 20 and outputs connected on the one hand, via a time delay element VZ and, on the other hand, directly to the control means MC which can correspond to the control means or microcomputer 9 according to FIG. 1. The time delay element consists, for example, of a retriggerable monostable device. The microcomputer MC can switch, via its output 21, the associated electronic switch S which simultaneously forms the transmission switch.

During operation, the comparators K in all transmitting and receiving stations, embodied by the control units, measure the potential on the data bus 7. If no transmission activity is present on the data bus 7, then the data bus is at a specific increased voltage level. If the data bus 7 lies at the reference voltage level over a time interval determined by the delay period of the delay element VZ, then the data bus is recognized as being cleared for transmission at each control unit. One of the control means MC, namely the one which the data bus 7 has first recognized as clear and at which a control process has first been called up, actuates its switch S so that the voltage of the data bus 7 falls to the reference potential of the line 16 with the result that all other control devices with their transmitting and receiving stations recognize that the data bus 7 is occupied.

The microcomputer MC in the control unit which the data bus 7 has claimed for its own transmission function now transmits its transmission data by periodic switching of the electronic switch S to the data bus 7 while all other control units are switched to receiving. The transmission data of the control unit acting on the data bus 7 pass via the non-delayed output lines 22 to the receivers of the other control units.

For the mode of operation of the data transmission system described above, it is necessary for the maximum period of the active signal level (switch S open) invariably to be shorter during transmission than the delay time of the delay elements VZ. Consequently, a control unit will invariably act upon the data bus 7 only once the data bus 7 has been at the reference voltage level at least for the duration of the delay time of the delay elements. As information can be exchanged via the common data bus 7, the access priorities of the individual control units can also be controlled directly.

We claim:

1. A power supply arrangement for use in an electrohydraulic support control system for mining and civil engineering, in which a group of control units utilize control means in the form of microprocessors, microcomputers or electronic evaluators to control temporary power supply of electrical loads from a constant voltage source common to the group, the voltage source being designed for a maximum current requirement of all electrical loads supplied by it; said arrangement comprising a current measuring device for each control unit for determining the effective dynamic current consumption of the unit and the loads controlled thereby, an adjustable current source for each control unit which is adjusted by the respective device to a current value dependent on the effective current consumption and a common potential line connected to all the adjustable current sources which carries a control voltage which varies according to a total of the current consumptions, of all the units, the control voltage being usable by the control means in the control units to determine the available current which the voltage source can deliver without overloading.

2. An arrangement according to claim 1, wherein each unit is further provided with a voltage measuring device which measures the voltage on the common potential line and transmits the information to the control means.

3. An arrangement according to claim 1, wherein each control unit is provided with a further current source which is controlled by the control means and is connected to the common potential line, the further current source providing a current which is dependent on a demanded current requirement for influencing the voltage on the common potential line during or before initiation of a control operation by the unit.

4. An arrangement according to claim 3, wherein the current sources and the further current sources are connected in parallel between the common potential line and a common reference potential.

5. An arrangement according to claim 1, wherein the common potential line is connected via a resistor to the supply line carrying a higher potential provided by the constant voltage source.

6. An arrangement according to claim 1, wherein the common potential line also forms a data bus to which the control units are connected.

7. An arrangement according to claim 6, wherein the control units are configured as transmitting and receiving stations and each unit is provided with an electronic switch with which the common potential line forming the data bus can be connected to a reference potential common to all the control units at the beginning of transmission of data.

8. An arrangement according to claim 7, wherein the control units each have a comparator for measuring the voltage on the common potential line, the comparator having an input connected to the potential line and outputs connected, via a time delay device to the control means of the associated control unit.

9. An arrangement according to claim 8, wherein the delay period of the time delay devices is greater than the longest period of a transmission digital pulse signal.

10. An arrangement according to claim 1, wherein the electrical supply lines which connect the source, the units and loads and the common potential line are combined to form one or more multi-core cables.

11. An arrangement according to claim 1, wherein the constant voltage source is an intrinsically safe direct current source.

12. An arrangement according to claim 1, wherein the constant voltage source is connected to a current input adapter which is also connected via current supply lines and the common potential line to the group of control units, and the adapter employs a resistor connected between the common potential line and the constant voltage source.

* * * * *